United States Patent
Song et al.

(10) Patent No.: US 10,306,404 B2
(45) Date of Patent: May 28, 2019

(54) SYSTEMS AND METHODS FOR UPDATING SEQUENCE OF SERVICES

(71) Applicant: BEIJING DIDI INFINITY TECHNOLOGY AND DEVELOPMENT CO., LTD., Beijing (CN)

(72) Inventors: Qi Song, Beijing (CN); Junqin Li, Beijing (CN); Zhongyu Cao, Beijing (CN); Chen Yao, Beijing (CN); Wen Luo, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/985,662

(22) Filed: May 21, 2018

(65) Prior Publication Data
US 2018/0270610 A1    Sep. 20, 2018

Related U.S. Application Data

(63) Continuation of application No. PCT/CN2016/111374, filed on Dec. 21, 2016.

(30) Foreign Application Priority Data

Dec. 22, 2015 (CN) .......................... 2015 1 0973197
Jan. 21, 2016 (CN) .......................... 2016 1 0040465

(51) Int. Cl.
*H04W 4/021* (2018.01)
*G06F 16/29* (2019.01)
(Continued)

(52) U.S. Cl.
CPC ............ *H04W 4/021* (2013.01); *G06F 16/29* (2019.01); *G06Q 50/30* (2013.01); *H04L 67/22* (2013.01); *H04W 4/029* (2018.02); *H04W 64/00* (2013.01)

(58) Field of Classification Search
CPC ..... H04W 4/021; H04W 4/029; H04W 64/00; G06F 17/30241; G06Q 50/30; H04L 67/22
(Continued)

(56) References Cited

U.S. PATENT DOCUMENTS 7,617,136 B1 * 11/2009 Lessing ................ G06Q 10/087
705/22
9,066,206 B2    6/2015 Lin et al.
(Continued)

FOREIGN PATENT DOCUMENTS

| CN | 102075557 A | 5/2011 |
|---|---|---|
| CN | 104823436 A | 8/2015 |
| WO | 2014074407 A1 | 5/2014 |

OTHER PUBLICATIONS

International Search Report in PCT/CN2016/111374 dated Mar. 27, 2017, 4 pages.
(Continued)

*Primary Examiner* — Mong-Thuy T Tran
(74) *Attorney, Agent, or Firm* — Metis IP LLC

(57) ABSTRACT

The present disclosure relates to systems and methods for updating a sequence of services. The systems may perform the methods to establish a network communication with the user terminal; obtain, from the user terminal, an identification associated with a user account registered with the system; obtain a current sequence of the plurality of services associated with the identification; determine whether a condition for updating the current sequence is satisfied, when the condition for updating the current sequence is not
(Continued)

satisfied, send the current sequence of the plurality of services to the user terminal; and when the condition for updating the current sequence is satisfied, determine an updated sequence of the plurality of services displayed on the display of the user terminal.

18 Claims, 9 Drawing Sheets

(51) Int. Cl.
  *H04W 4/029* (2018.01)
  *H04L 29/08* (2006.01)
  *G06Q 50/30* (2012.01)
  *H04W 64/00* (2009.01)
(58) Field of Classification Search
  USPC .................................................... 455/456.2
  See application file for complete search history.

(56) References Cited

U.S. PATENT DOCUMENTS

| | | | |
|---|---|---|---|
| 2003/0004937 A1* | 1/2003 | Salmenkaita | G01C 21/20 |
| 2003/0100315 A1* | 5/2003 | Rankin | H04M 3/487 |
| | | | 455/456.3 |
| 2009/0030885 A1* | 1/2009 | DePasquale | G06Q 10/02 |
| 2009/0037268 A1* | 2/2009 | Zaid | G06Q 30/02 |
| | | | 705/14.39 |
| 2010/0205061 A1* | 8/2010 | Karmarkar | G06Q 30/02 |
| | | | 705/14.64 |
| 2010/0211568 A1* | 8/2010 | Chu | G06F 17/30867 |
| | | | 707/732 |
| 2011/0099040 A1 | 4/2011 | Felt et al. | |
| 2011/0289015 A1* | 11/2011 | Mei | G06Q 10/04 |
| | | | 705/347 |
| 2013/0132140 A1* | 5/2013 | Amin | G06Q 10/02 |
| | | | 705/7.13 |
| 2013/0132246 A1 | 5/2013 | Amin et al. | |
| 2013/0268406 A1* | 10/2013 | Radhakrishnan | G06Q 30/0283 |
| | | | 705/26.61 |
| 2014/0129302 A1* | 5/2014 | Amin | G06Q 50/30 |
| | | | 705/13 |
| 2014/0129951 A1* | 5/2014 | Amin | G06O 50/30 |
| | | | 715/738 |
| 2014/0274145 A1 | 9/2014 | Cronin et al. | |
| 2015/0081362 A1* | 3/2015 | Chadwick | G06Q 10/06311 |
| | | | 705/7.14 |
| 2015/0356703 A1* | 12/2015 | Ellis | G06Q 50/30 |
| | | | 705/7.17 |
| 2017/0206201 A1* | 7/2017 | Chidlovskii | G06F 17/3053 |

OTHER PUBLICATIONS

Written Opinion in PCT/CN2016/111374 dated Mar. 27, 2017, 4 pages.
The extended European search report in European Application No.16877742.3 dated Sep. 18, 2018, 9 pages.

* cited by examiner

SYSTEMS AND METHODS FOR UPDATING SEQUENCE OF SERVICES

CROSS-REFERENCE TO RELATED APPLICATIONS

This application is a continuation of International Application No. PCT/CN2016/111374, filed on Dec. 21, 2016, which designates the United States of America and claims priority of Chinese Application No. CN 201510973197.1, filed on Dec. 22, 2015 and Chinese Application No. CN 201610040465.9, filed on Jan. 21, 2016, contents of which are hereby incorporated by reference in their entirety.

TECHNICAL FIELD

This application relates generally to a system and method for operating an on-demand service, and in particular, a system and method for updating a sequence of services.

BACKGROUND

On-demand services become more and more popular. A mobile transportation service application may include multiple services that a user may choose. The application may display the multiple services in a sequence. It is desirable to have customized sequence of services for a certain user without updating too often.

SUMMARY

According to an aspect of the present disclosure, a system may include at least one computer-readable storage medium and at least one processor configured to communicate with the at least one computer-readable storage medium. The at least one computer-readable storage medium may include a set of instructions for updating a sequence of services. When the at least one processor executing the set of instructions, the at least one processor may be directed to perform one or more of the following operations. The at least one processor may establish a network communication with the user terminal. The at least one processor may obtain, from the user terminal, an identification associated with a user account registered with the system. The at least one processor may obtain a current sequence of the plurality of services associated with the identification. The at least one processor may determine whether a condition for updating the current sequence is satisfied. The at least one processor may send the current sequence of the plurality of services to the user terminal when the condition for updating the current sequence is not satisfied. The at least one processor may determine that an updated sequence of the plurality of services may be displayed on the display of the user terminal when the condition for updating the current sequence is satisfied.

In some embodiments, the at least one processor may obtain, from the user terminal, a current location of the user terminal. The condition may include at least one of a number of days in which the user initiates service requests within a first geographical area encompassing the current location of the user terminal being more than a first threshold, an interval between a previous updating time of the sequence of the plurality of services and a current instance being longer than a second threshold or a ratio between a characteristic value for the current sequence of the plurality of services and a characteristic value for an optimized sequence of the plurality of services being less than a third threshold.

In some embodiments, the characteristic value for the current sequence of the plurality of services may be a sum of a plurality of fractions. Each fraction of the plurality of fractions may be associated with a service of the plurality of services. For each service, the fraction for the service may be associated with an order of the service in the current sequence of the plurality of services and a travel value of the service indicating a trend of the user to request for the service.

In some embodiments, the travel value may be determined based on at least one of a number of historical service requests for the service within a first time period, a number of completed historical service requests for the service within the first time period, current availability information indicating a supply level of the service; a number of page views for a page displaying the service, or a number of unique visitors visiting the page displaying the service.

In some embodiments, for each service of the plurality of services, the at least one processor may obtain records of historical requests to service conducted through the user terminal. The at least one processor may determine, based on the records of the historical requests, a travel value indicating a trend of the user to request for the service. The at least one processor may determine the updated sequence based on the travel value of the service.

In some embodiments, the at least one processor may obtain, from the user terminal, a current instance and a current location of the user terminal. For each service of the plurality of services, the at least one processor may obtain records of historical requests to service prior to the current instance. The at least one processor may obtain current availability information indicating a supply level of the service within a vicinity of the current location of the user terminal. The at least one processor may determine, based on the records of the historical requests and the current availability information, a probability that the service will be selected by the user. The at least one processor may determine an updated order of the service in the updated sequence based on the probability.

In some embodiments, the current availability information of the service may include a number of available service providers associated with the service within the vicinity of the user terminal and a number of current service requests associated with the service within a second time period from the current instance within a vicinity of the user terminal.

In some embodiments, the records of historical requests may include a first type of records associated with one or more other user terminals within a second geographical area encompassing the current location of the user terminal. For each service, the first type of records may include a number of a plurality of first historical requests within a third time period from the current instance.

In some embodiments, the records of historical requests may further include a second type of records associated with the user terminal. For each service, the second type of records may include at least one of a number of a plurality of second historical requests, a plurality of second historical requesting time wherein each second historical requesting time of the plurality of second historical requesting time may be associated with a second historical request of the plurality of second historical requests, a probability of using coupons for the user, or information relating to the user's visit to a page displaying the service.

In some embodiments, for each service, the information relating to the user's visit to the page displaying the service may include at least one of a number of visit to the page and a total duration on the page.

According to another aspect of the present disclosure, a method may include one or more of the following operations. A computer server may establish a network communication with the user terminal. The computer server may obtain, from the user terminal, an identification associated with a user account registered with the system. The computer server may obtain a current sequence of the plurality of services associated with the identification. The computer server may determine whether a condition for updating the current sequence is satisfied. The computer server may send the current sequence of the plurality of services to the user terminal when the condition for updating the current sequence is not satisfied. The computer server may determine that an updated sequence of the plurality of services may be displayed on the display of the user terminal when the condition for updating the current sequence is satisfied.

In some embodiments, the computer server may obtain, from the user terminal, a current location of the user terminal. The condition may include at least one of a number of days in which the user initiates service requests within a first geographical area encompassing the current location of the user terminal being more than a first threshold, an interval between a previous updating time of the sequence of the plurality of services and a current instance being longer than a second threshold or a ratio between a characteristic value for the current sequence of the plurality of services and a characteristic value for an optimized sequence of the plurality of services being less than a third threshold.

In some embodiments, the characteristic value for the current sequence of the plurality of services may be a sum of a plurality of fractions. Each fraction of the plurality of fractions may be associated with a service of the plurality of services. For each service, the fraction for the service may be associated with an order of the service in the current sequence of the plurality of services and a travel value of the service indicating a trend of the user to request for the service.

In some embodiments, the travel value may be determined based on at least one of a number of historical service requests for the service within a first time period, a number of completed historical service requests for the service within the first time period, current availability information indicating a supply level of the service, a number of page views for a page displaying the service, or a number of unique visitors visiting the page displaying the service.

In some embodiments, for each service of the plurality of services, the computer server may obtain records of historical requests to service conducted through the user terminal. The computer server may determine, based on the records of the historical requests, a travel value indicating a trend of the user to request for the service. The computer server may determine the updated sequence based on the travel value of the service.

In some embodiments, the computer server may obtain, from the user terminal, a current instance and a current location of the user terminal. For each service of the plurality of services, the computer server may obtain records of historical requests to service prior to the current instance. The computer server may obtain current availability information indicating a supply level of the service within a vicinity of the current location of the user terminal. The computer server may determine, based on the records of the historical requests and the current availability information, a probability that the service will be selected by the user. The computer server may determine an updated order of the service in the updated sequence based on the probability.

In some embodiments, the current availability information of the service may include a number of available service providers associated with the service within the vicinity of the user terminal and a number of current service requests associated with the service within a second time period from the current instance within a vicinity of the user terminal.

In some embodiments, the records of historical requests may include a first type of records associated with one or more other user terminals within a second geographical area encompassing the current location of the user terminal. For each service, the first type of records may include a number of a plurality of first historical requests within a third time period from the current instance.

In some embodiments, the records of historical requests may further include a second type of records associated with the user terminal. For each service, the second type of records may include at least one of a number of a plurality of second historical requests, a plurality of second historical requesting time wherein each second historical requesting time of the plurality of second historical requesting time is associated with a second historical request of the plurality of second historical requests, a probability of using coupons for the user, or information relating to the user's visit to a page displaying the service.

In some embodiments, for each service, the information relating to the user's visit to the page displaying the service may include at least one of a number of visit to the page and a total duration on the page.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
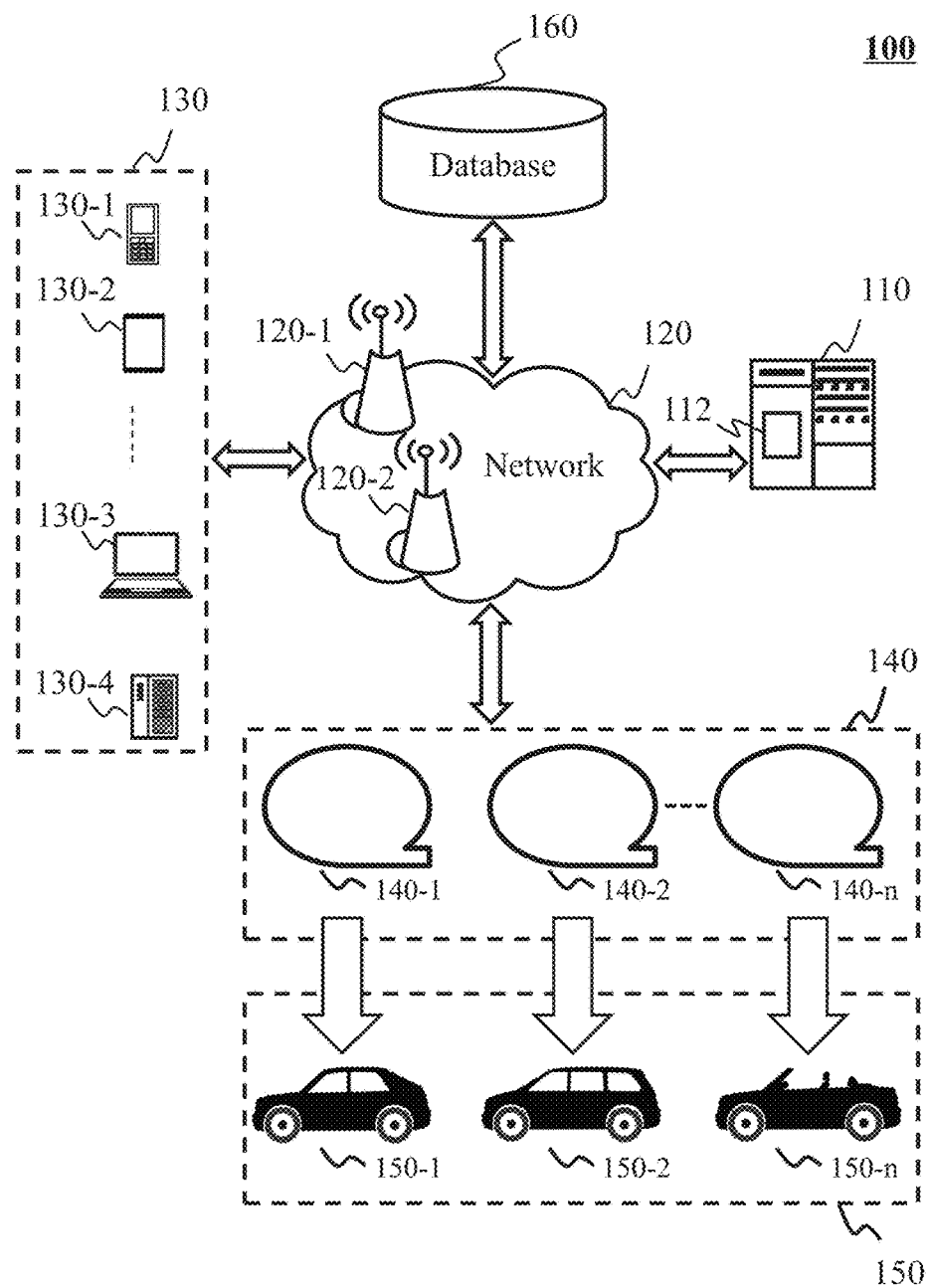
FIG. 1 is a block diagram of an exemplary on-demand service system according to some embodiments.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to allocate a set of sharable orders, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The term "user", "passenger," "requestor," "service requestor," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. In the present disclosure, "user" and "user terminal 130" may be used interchangeably.

The term "service request", "requests", and "order" in the present disclosure are used interchangeably to refer to a request that may be initiated by a user, a passenger, a service requestor, a customer, a driver, a provider, a service provider, a supplier, or the like, or any combination thereof. The service request may be accepted by any one of a passenger, a user, a service requestor, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

According to an aspect of the present disclosure, a service platform providing multiple services may display the services on a user terminal in a sequence. In the sequence, a service preferred by the user or a service with a highest likelihood to be requested may be displayed in a prominent position (e.g., the foreground or the top) to make it easier for the user to choose. The sequence may be updated according to real situations. An aspect of the present disclosure relates to online systems and methods for updating a sequence of services to be displayed on a user terminal without disturbing the user. The systems and methods may do so by determining whether a condition for updating a current sequence is satisfied. Only when the condition for updating a current sequence is satisfied, may the systems and methods update the sequence of services. Thus, the systems and methods may recommend to the user an accurate sequence of services from which it is convenient to choose his/her desired service without disturbing the user frequently.

It should be noted that online on-demand transportation service, such as online taxi hailing, is a new form of service rooted only in post-Internet era. It provides technical solutions to users and service providers that could raise only in post-Internet era. In pre-Internet era, when a user hails a taxi on street, the user cannot select a service in advance. If the passenger hails a taxi through telephone call, the service provider (e.g., one taxi company or agent) may only recommend a service to the user manually. Besides, the recommendation may not be accustomed. The recommendation may be out of date and unable to reflect the current situation. Online taxi, however, allows a user of the service to real-time and automatic distribute a service request to a vast number of individual service providers (e.g., taxi) distance away from the user. The user may send a service request from a user terminal using a service application. Before sending the service request, the application may recommend a service to the user automatically. By displaying services in a sequence, the online on-demand transportation systems reduces users' manual manipulations on the user interface and enhance user experience. It also allows a plurality of service provides to respond to the service request simultaneously and in real-time. Therefore, through Internet, the online on-demand transportation systems may provide a much more efficient transaction platform for the users and the service providers that may never met in a traditional pre-Internet transportation service system.

FIG. 1 is a block diagram of an exemplary on-demand service system 100 according to some embodiments. For example, the on-demand service system 100 may be an online transportation service platform for transportation services such as a taxi hailing service, a chauffeur service, an express car service, a carpool service, a bus service, a driver hire service, and a shuttle service. The on-demand service system 100 may be an online platform including a server 110, a network 120, a user terminal 130, a provider terminal 140, a vehicle 150, and a database 160. The server 110 may include a processing engine 112.

The on-demand service system 100 may provide a plurality of services. Exemplary service may include a taxi hailing service, a chauffeur service, an express car service, a carpool service, a bus service, a driver hire service, and a shuttle service. In some embodiments, the on-demand service may be any on-line service, such as booking a meal, shopping, or the like, or a combination thereof. In some embodiments, the plurality of services may be displayed in a sequence. Each service may have an order or a ranking in the sequence.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the user terminal 130, the provider terminal 140, and/or the database 160 via the network 120. As another example, the server 110 may be directly connected to the user terminal 130, the provider terminal 140, and/or the database 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine a target vehicle based on the service request obtained from the user terminal 130. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the user terminal 130, the provider terminal 140, the vehicle 150, and the database 160) may send information and/or data to other component(s) in the on-demand service system 100 via the network 120. For example, the server 110 may obtain/acquire service request from the user terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a user may be an owner of the user terminal 130. In some embodiments, the owner of the user terminal 130 may be someone other than the user. For example, an owner A of the user terminal 130 may use the user terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "user" and "user terminal 130" may be used interchangeably, and "provider" and "provider terminal" may be used interchangeably.

In some embodiments, the user terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the user terminal 130 may be a device with positioning technology for locating the position of the user and/or the user terminal 130.

The provider terminal 140 may include a plurality of provider terminals 140-1, 140-2, . . . , 140-n. In some embodiments, the provider terminal 140 may be similar to, or the same device as the user terminal 130. In some embodiments, the provider terminal 140 may be a device with positioning technology for locating the position of the provider, the provider terminal 140, and/or a vehicle 150 associated with the provider terminal 140. In some embodiments, the user terminal 130 and/or the provider terminal 140 may communicate with other positioning device to determine the position of the user, the user terminal 130, the provider, and/or the provider terminal 140. In some embodiments, the user terminal 130 and/or the provider terminal 140 may send positioning information to the server 110. In some embodiments, the provider terminal 140 may have an availability status. The availability status may indicate whether a vehicle 150 associated with the provider terminal 140 is available to carry a user.

In some embodiments, the provider terminal 140 may correspond to one or more vehicles 150. The vehicles 150 may carry the user and travel to the destination. The vehicles 150 may include a plurality of vehicles 150-1, 150-2, . . . , 150-n. One vehicle may correspond to one type of services (e.g., a taxi hailing service, a chauffeur service, an express car service, a carpool service, a bus service, a driver hire service, and a shuttle service).

The database 160 may store data and/or instructions. In some embodiments, the database 160 may store data obtained from the user terminal 130 and/or the provider terminal 140. In some embodiments, the database 160 may store data and/or instructions that the server 110 may execute or use to perform exemplary methods described in the present disclosure. In some embodiments, database 160 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 160 may be connected to the network 120 to communicate with one or more components in the on-demand service system 100 (e.g., the server 110, the user terminal 130, the provider terminal 140, etc.). One or more components in the on-demand service system 100 may access the data or instructions stored in the database 160 via the network 120. In some embodiments, the database 160 may be directly connected to or communicate with one or more components in the on-demand service system 100 (e.g., the server 110, the user terminal 130, the provider terminal 140, etc.). In some embodiments, the database 160 may be part of the server 110.

In some embodiments, one or more components in the on-demand service system 100 (e.g., the server 110, the user terminal 130, the provider terminal 140, etc.) may have a permission to access the database 160. In some embodiments, one or more components in the on-demand service system 100 may read and/or modify information relating to the user, provider, and/or the public when one or more conditions are met. For example, the server 110 may read and/or modify one or more users' information after a service.

In some embodiments, information exchanging of one or more components in the on-demand service system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
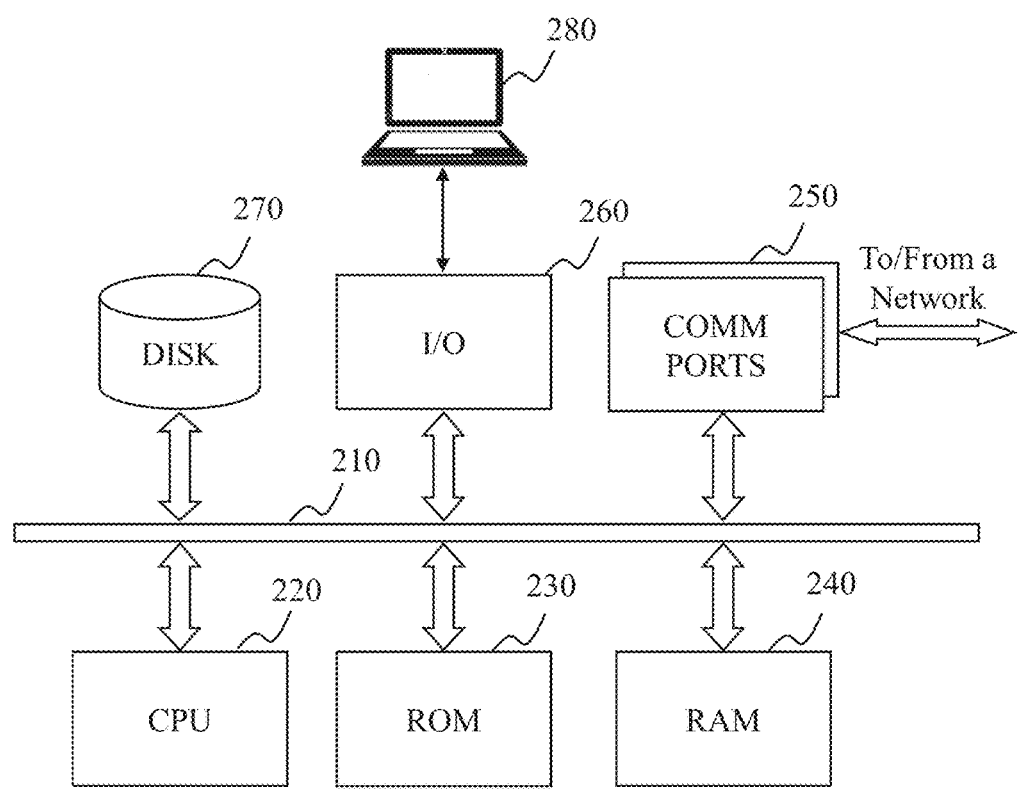
FIG. 2 is a block diagram illustrating an exemplary computing device in the on-demand service system according to some embodiments of the present disclosure.

FIG. 2 is a schematic diagram illustrating exemplary hardware and software components of a computing device 200 on which the computer server 110, the user terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the CPU 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

Merely for illustration, only one CPU and/or processor is described in the computing device 200. However, it should be note that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
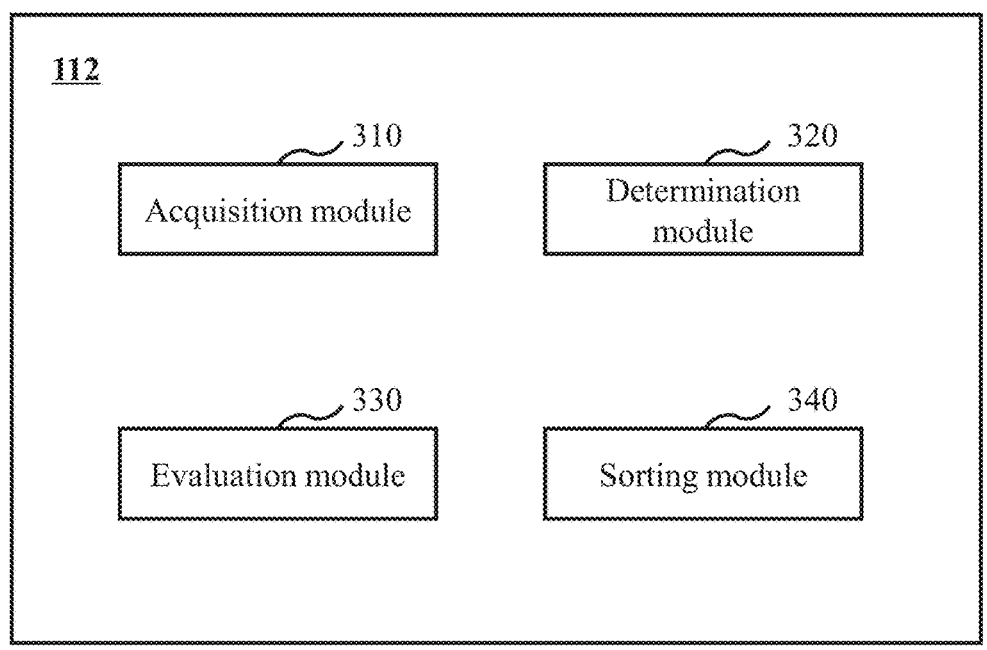
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include an acquisition module 310, a determination module 320, an evaluation module 330, and a sorting module 340.

The acquisition module 310 may be configured to obtain information from a plurality of users, a plurality of service providers, or other sources (public transportation source, metropolitan source, etc.).

The acquisition module 310 may obtain an identification from the user terminal 130 via the network 120. The acquisition module 310 may further obtain other information (e.g., a current location, a current instance, a current sequence of a plurality of services) of the user or the user terminal 130.

The determination module 320 may be configured to determine whether a condition for updating the current sequence of the plurality of services (e.g., a plurality of transportation services, such as taxi, carpool, test drive services) is satisfied. In some embodiments, the determination module 320 may use information obtained by the acquisition module 310 to conduct the determination.

When the determination module 320 determines that the condition for updating the current sequence of the plurality of services is satisfied, the evaluation module 330 may be configured to determine a plurality of travel values for the plurality of services. As used herein, a travel value for a service may be a value indicating a user's preference among a plurality of services, frequency of usage of the plurality of services, probability of requesting for a service, and/or current availability of the service. The evaluation module 330 may determine a travel value for each service.

The evaluation module 330 may also determine a characteristic value associated with a sequence of the plurality of services. In some embodiments, the characteristic value may be determined as a sum of a plurality of fractions. Each fraction may correspond to one service. The evaluation module 330 may determine the fraction for a service.

The sorting module 340 may determine an updated sequence of the plurality of services. In some embodiments, the sorting module 340 may determine the updated sequence based on travel values of the plurality of services. The sorting module 340 may determine an order in the updated sequence for each of the plurality of services. The order for the service may indicate the preference of the user and/or the availability of the service.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the acquisition module 310 may be integrated in the determination module 320 as a single module which may both obtain information from the user terminal 130 and determine whether the condition for updating the sequence is satisfied based on the obtained information.

Figure 4:
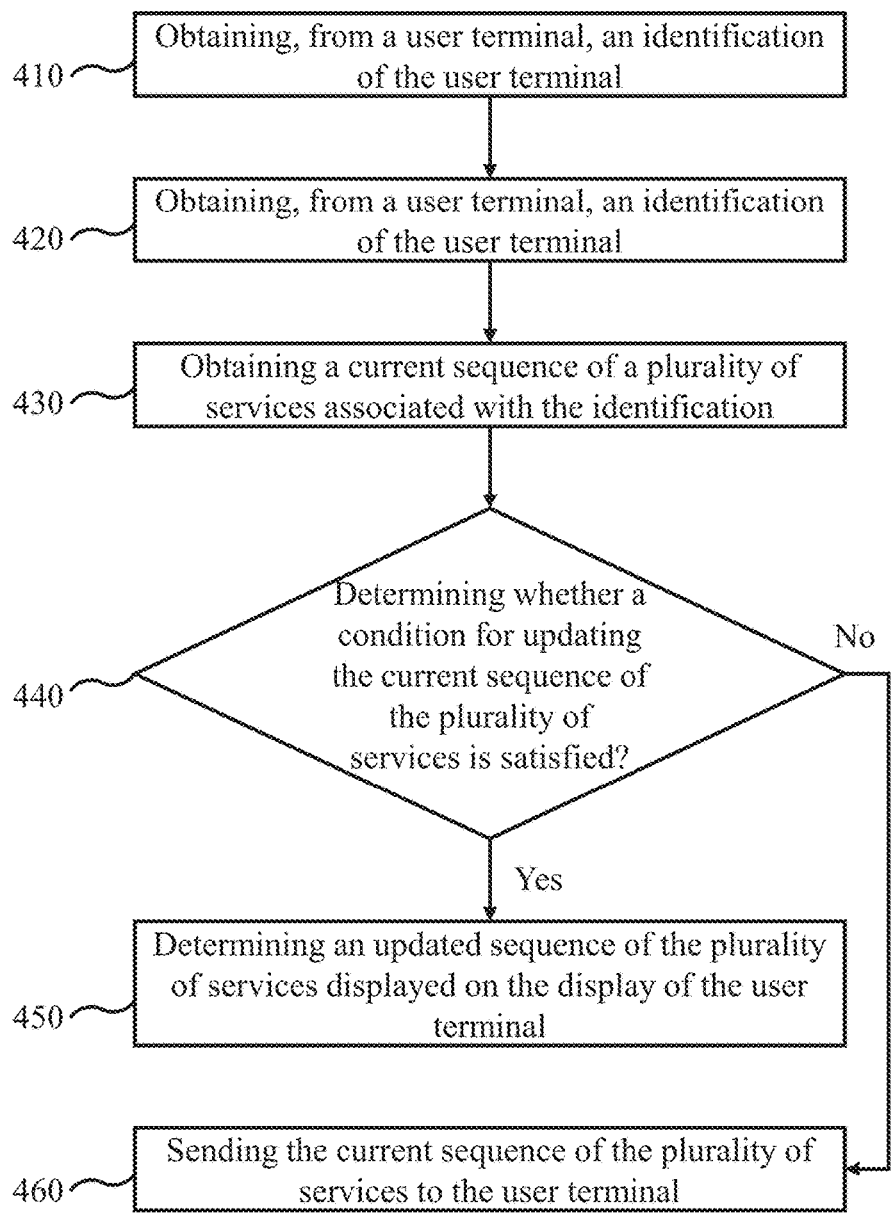
FIG. 4 shows an exemplary process 400 for updating a sequence of a plurality of services displayed as a sequence of options on a display of a user terminal of a user according to some embodiments of the present disclosure.

FIG. 4 shows an exemplary process 400 for updating a sequence of a plurality of services displayed as a sequence of options on a display of a user terminal 130 of a user. The process 400 may be implemented as a set of instructions in a non-transitory storage medium of the computer server 110 of the system 100. The CPU 220 of the computer server 110 may execute the set of instructions and may accordingly perform the stops in the process 400.

In step 410, COM ports 250 may establish network communications with a user terminal 130. The network communications may be a wired communication or a wireless communication. Exemplary wireless communication may include cellular communication, wireless local area network (WLAN), WiMAX communication, Bluetooth communication, etc.

In some embodiments, COM ports 250 may establish the network communications after a certain trigger event. The trigger event may be a launching of a service application in the user terminal 130, a request for communication with the server 110, a receipt of location information from the user terminal 130, a login of an account through the user terminal 130, a request for updating the sequence of services, etc.

In step 420, acquisition module 310 may obtain, from a user terminal 130, an identification. The identification may be any identification to identify the user. For example, the identification may be associated with the user, the user terminal 130, and/or an account that the user registered with the online on-demand transportation service system 100, so that the acquisition module 310 may identify the user after the communications in step 410 are established. The identification may be in the form of a phone number, a user account, or a unique identification associated with the user terminal 130 (media control access address, serial number, manufacture number, etc.). The user account may be an account registered at the transportation service platform.

In step 430, acquisition module 310 may obtain a current sequence of a plurality of services associated with the identification.

The system 100 may provide a plurality of transportation services to the user. After the acquisition module 310 obtains the identification of the user, user terminal and/or user account, the system 100 may retrieve and/or obtain the plurality of transportation services available to the user as a list. Further, the plurality of transportation services in the list may be ordered with a current sequence. The current sequence may be generated prior to the current instance by CPU 220, or any other processor of the computer server 110. Alternatively, the current sequence may be set by the user according to his/her preference. The current sequence may be stored in the user terminal 130, the ROM 230, or the database 160.

In step 440, determination module 320 may determine whether a condition for updating the current sequence is satisfied.

When the condition for updating the current sequence of the plurality of services is satisfied, in step 450, sorting module 340 may determine an updated sequence of the plurality of services displayed on the display of the user terminal 130. COM ports 250 may send the updated sequence to the user terminal 130 through the network communications. A display of the user terminal 130 may display the updated sequence in the user interface of the service application.

When the condition for updating the current sequence of the plurality of services is not satisfied, in step 460, COM ports 250 may send the current sequence of the plurality of services to the user terminal 130.

In some embodiments, the condition may include the following conditions:
  (I). When the last time that the user used one or more of the plurality of transportation services in the same area of the current location is long enough, i.e., when the number of days in which the user initiated service requests within a first geographical area encompassing the current location of the user terminal 130 is more than a first threshold;
  (II). When the sequence of the plurality of transportation services has not been updated for a long time, i.e., when an interval between a previous updating time of the sequence of the plurality of services and a current instance is more than a second threshold;
  (III). When there are other reasons to update the sequence of the plurality of transportation services. For example, when the current sequence of the plurality of services are too far from an optimized order, i.e., when a ratio between a characteristic value for an optimized sequence of the plurality of services of the plurality of services and a characteristic value for the current sequence is less than a third threshold;
or any combination thereof.

The first threshold may be any suitable duration, for example, ten days, one month, one quarter, etc. When the number of days in which the user initiates service requests within a first geographical area (for example, a city) is larger than the first threshold, sorting module 340 may determine an updated sequence. The first threshold may prevent scenarios of overly frequently updating of the sequence. Sorting module 340 may determine a time/deadline for updating the sequence according to historical locations of the user terminal 130.

The second threshold may be any suitable duration, for example, twenty days, one month, one quarter, etc. The second threshold may be the same as or different to the first threshold. When the interval between a previous updating time of the sequence of the plurality of services and a current instance is more than a second threshold, sorting module 340 may determine an updated sequence and update the sequence. The second threshold may prevent the sequence of the plurality of transportation services being overly out-of-dated. Accordingly, sorting module 340 may determine a time/deadline for updating the sequence according to history of previous updates of the sequence.

The third threshold may be any ratio, for example, 0.5, 0.75, 0.8, 0.9, etc. The ratio between the characteristic value for the current sequence of the plurality of services and the characteristic value for the optimized sequence of the plurality of services may indicate the extent to which the current sequence deviates from the optimized sequence. A larger ratio may indicate that the current sequence approximates the optimized sequence. The optimized sequence may suggest the user's trend or preference to the plurality of services under the current conditions accurately. The third threshold may help the sequence of the plurality of services be timely updated when something substantial to the plurality of services occurs (e.g., when there is a promotion and/or a change of term of the services, etc. that causes change of the sequence).

In some embodiments, the characteristic value for the current sequence of the plurality of services may be determined as a sum of a plurality of fractions. Each fraction of the plurality of fractions may be associated with a service of the plurality of services. Evaluation module 330 may determine the fraction for the service based on an order of the service in the current sequence and a travel value of the service. The travel value may indicate a trend of the user to request for the service.

The characteristic value and/or the fractions may take various form or definitions.

Determination module 320 may determine whether one or more of the above three conditions are satisfied. If the one or more of the three conditions are satisfied, determination module 320 may determine an updated sequence of the plurality of services.

In some embodiments, the characteristic value may include a DCG (Discounted Cumulative Gain) value associated with a sequence of the plurality of services. The DCG value may indicate a quality of the sequence of the services. When sorting multiple elements, it may be desired that the significant elements should have higher ranks or prominent positions while the insignificant elements should have lower ranks. A larger DCG value of a sequence may indicate that more significant elements have higher ranks in the sequence (e.g., at the top). A smaller DCG value of a sequence may indicate that the one or more significant elements are assigned lower ranks in the sequence (e.g., at the bottom). The ratio between a characteristic value for the current sequence of the plurality of services and the characteristic value for the optimized sequence of the plurality of services may include an NDCG (Normalized Discounted Cumulative Gain) value. An optimized sequence may assign a most significant element the highest position (i.e., No. 1), then the second-most significant element the second-highest position (i.e., No. 2), etc. The NDCG value for the current sequence may vary from 0.0 to 1.0, with 1.0 indicating that the current sequence is exactly the optimized sequence.

In some embodiments, the user interface of the application may display a part of the plurality of services in an active window or interface. The user interface may display the other part of the plurality of services in a background window or interface.

For example, the total number of services provided by the system 100 may be an integer n. The number of services displayed in an active window on a user's terminal may be another integer m. The integer m may be no larger than the integer n. Thus the number of services displayed in a background window may be an integer (n-m). Sorting module 340 may determine that a sequence of the (n-m) services in the background window or interface may be updated. Additionally or alternatively, sorting module 340 may determine that a sequence of the m services in the active window may not be updated.

Figure 5:
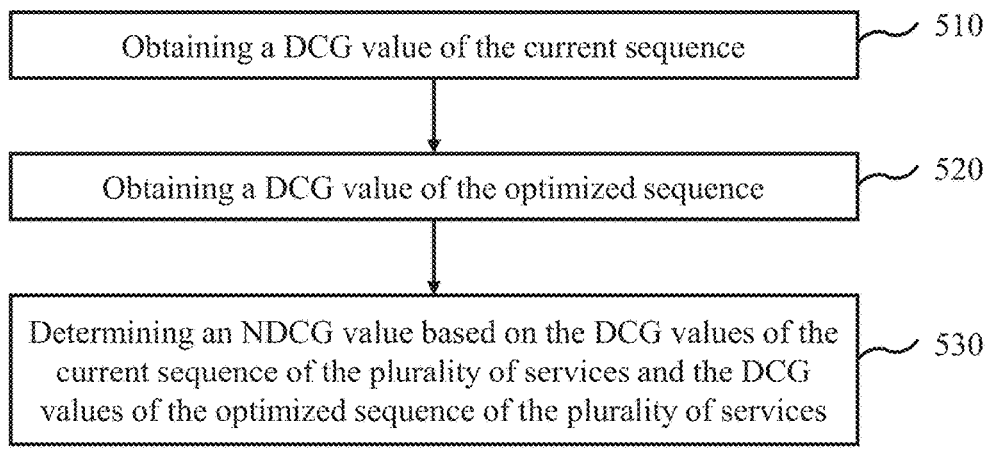
FIG. 5 shows an exemplary process 500 for determining a ratio between the characteristic value for the current sequence of the plurality of services and the characteristic value for the optimized sequence of the plurality of services according to some embodiments of the present disclosure.

FIG. 5 shows an exemplary process 500 for determining a ratio between the characteristic value for the current sequence of the plurality of services and the characteristic value for the optimized sequence of the plurality of services. The process and/or method 500 may be executed by the on-demand service system 100. For example, the process and/or method 500 may be implemented as a set of instructions (e.g., an application) stored in the ROM 230. The CPU 220 may execute the set of instructions and may accordingly be directed to perform the process and/or method 500.

In step 510, acquisition module 310 may obtain a DCG value of the current sequence of the plurality of services.

The DCG value for a sequence of a plurality of services may be as equations (1) and (2) show:

$$DCG = \sum_n f_n \quad (1)$$

$$f_n = \frac{R_n}{\log(1 + rank_n)} \quad (2)$$

The DCG value for the current sequence of the plurality of services is determined as a sum of a plurality of fractions. Each fraction of the plurality of fractions may be associated with a service of the plurality of services. For the nth service, the fraction $f_n$ may be determined based on an order of the nth service $rank_n$ in the current sequence and a travel value $R_n$ of the nth service. In some embodiments, $rank_n$ may be any other value associated with the order of the nth service, for example, the square of the nth service, the square root of the order of the nth service, etc.

Thus the DCG value may be as equation (3) shows:

$$DCG = \sum_n f_n = \sum_n \frac{R_n}{\log(1 + rank_n)} \quad (3)$$

In step 520, acquisition module 310 may obtain a DCG value of the optimized sequence of the plurality of services.

Sorting module 340 may determine an optimized sequence according to the travel value. In some embodiments, sorting module 340 may sort the services according to their travel values.

In step 530, evaluation module 330 may determine an NDCG value based on the DCG values of the current sequence of the plurality of services and the DCG values of the optimized sequence of the plurality of services.

Take the following as an example. If there are four services, namely, D1, D2, D3, and D4. The travel value for a service is equal to how many times a user initiates the service in a predetermined period of time (i.e., frequency of use). The frequencies of usage for the four services D1, D2, D3, and D4 are 3, 5, 0, and 3, respectively. If a current sequence of the four services are (D1, D2, D4, D3). Service D1 is ranked at the top, while service D3 is ranked at the bottom. The DCG value for the current sequence is as equation (4) shows:

$$DCG_c = \sum_n \frac{R_n}{\log(1 + rank_n)} = \quad (4)$$
$$\frac{3}{\log(1+1)} + \frac{5}{\log(1+2)} + \frac{3}{\log(1+3)} + \frac{0}{\log(1+4)} = 16.92$$

The optimized sequence for the above example may be (D2, D1, D4, D3). The DCG value for the optimized sequence is as equation (5) shows:

$$DCG_o = \sum_n \frac{R_n}{\log(1 + rank_n)} = \quad (5)$$
$$\frac{5}{\log(1+1)} + \frac{3}{\log(1+2)} + \frac{3}{\log(1+3)} + \frac{0}{\log(1+4)} = 15.75$$

Thus the NDCG value between the optimized sequence and the current sequence is as equation (6) shows:

$$NDCG = \frac{DCG_o}{DCG_c} = \frac{15.75}{16.92} = 0.93 \quad (6)$$

If the third threshold is 0.8, the NDCG value is not less than the third threshold. Thus the condition (III) is not satisfied. The deviation of the current sequence from the optimized sequence is quite little. In some scenarios, replacing the current sequence with the optimized sequence may cause inconvenience or confusion to the user. COM ports 250 may send the current sequence to a user terminal 130 of the user.

Figure 6:
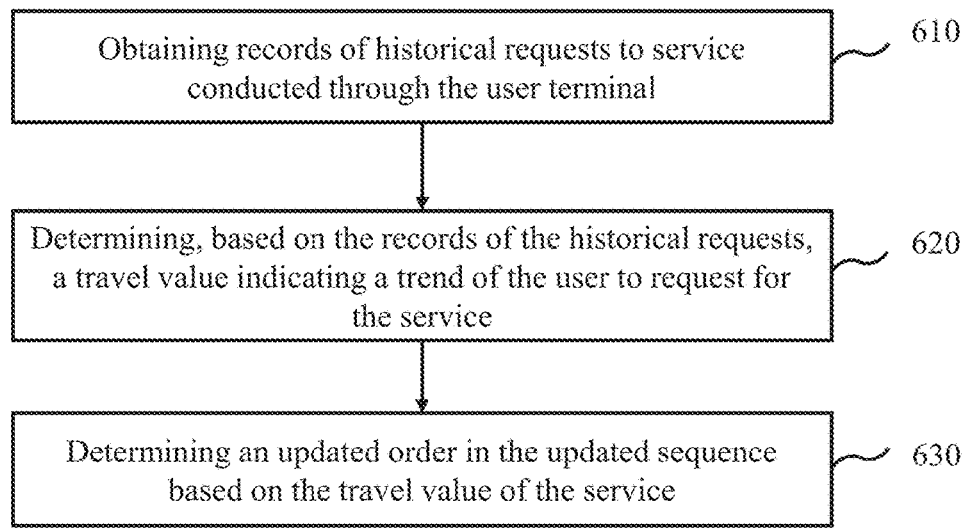
FIG. 6 shows an exemplary process 600 for determining an updated order in the updated sequence of the plurality of services for one service according to some embodiments of the present disclosure.

In some embodiments, sorting module 340 may determine the updated sequence of the plurality of services according to a process 600 shown in FIG. 6.

When condition for updating the current sequence is satisfied, sorting module 340 may determine an updated sequence. FIG. 6 shows an exemplary process 600 for determining an updated order in the updated sequence of the plurality of services for one service. The process and/or method 600 may be executed by the on-demand service system 100. For example, the process and/or method 600 may be implemented as a set of instructions (e.g., an application) stored in the ROM 230. The CPU 220 may execute the set of instructions and may accordingly be directed to perform the process and/or method 600.

In step 610, acquisition module 310 may obtain records of historical requests to service conducted through the user terminal 130. The records of historical requests may be stored in the user terminal 130, ROM 230, or database 160. The records of historical requests may be associated with one or more among the plurality of services. In some embodiments, the historical requests may be within a first time period prior to a current instance. The length of first time period may be an hour, a day, a week, a month, a quarter, or any other suitable duration.

In step 620, for each service of the plurality of services, evaluation module 330 may determine, based on the records of the historical requests, a travel value indicating a trend of the user to request for the service.

In step 630, sorting module 340 may determine an updated order in the updated sequence based on the travel value of the service. Further, sorting module 340 may determine the updated sequence according to updated orders of the plurality of services. The plurality of services in the updated sequence may be in a descending order or in an ascending order.

In some embodiments, evaluation module 330 may determine the travel value for each service based on at least one of: a number of historical requests for the service within the first time period (as hereinbefore described); a number of completed historical requests for the service within the first time period; current availability information indicating a supply level of the service; a number of page views for a page displaying the service; or a number of unique visitors visiting the page displaying the service.

The number of historical requests and the number of completed historical requests for the service within the first time period may reflect frequency of usage of the user for the service.

The current availability information of a service may include a number of service providers associated with the service within a vicinity of the user terminal 130 and a number of current service requests associated with the service within a second time period from the current instance within the vicinity of the user terminal 130.

The service providers may have an availability status showing they are ready to provide service. The second time period may be a relatively short time period. The duration of second time period may be 5 minutes, 10 minutes, 15 minutes, etc. Service requests may be instantaneous or randomly distributed with respect to time. Evaluation module 330 may determine demands from a plurality of users according to the number of service requests within the second time period.

The current availability information may be local. The vicinity of the user terminal 130 may be a local area encompassing the current location of the user terminal 130. The local area may be a circle surrounding the current location of the user terminal 130. The circle may have a preset radium, say, 500 meters, 1 kilometer, 2 kilometers, etc. Alternatively, the local area may be in any other form or shape. The local area may be any area encompassing the current location of the user terminal 130. For example, the local area may be a business district, a residential district, a neighborhood, etc.

In some embodiments, the system 100 may direct a user terminal to display the plurality of services on a plurality of pages. Each page may display one service. The application (mobile or desktop application) may have a user interface including the pages. The number of page views for a page displaying the service may reflect interest or attention of the user. The number of page views for a page displaying the service may include a number of page views by the user.

In some embodiments, evaluation module 330 may determine the travel value of a service according to a number of unique visitors visiting the page displaying the service. The number of unique visitors visiting the page displaying the service may reflect popularity of the service among a group of users.

Evaluation module 330 may determine a travel value for a service according to a predetermined rule.

Figure 7:
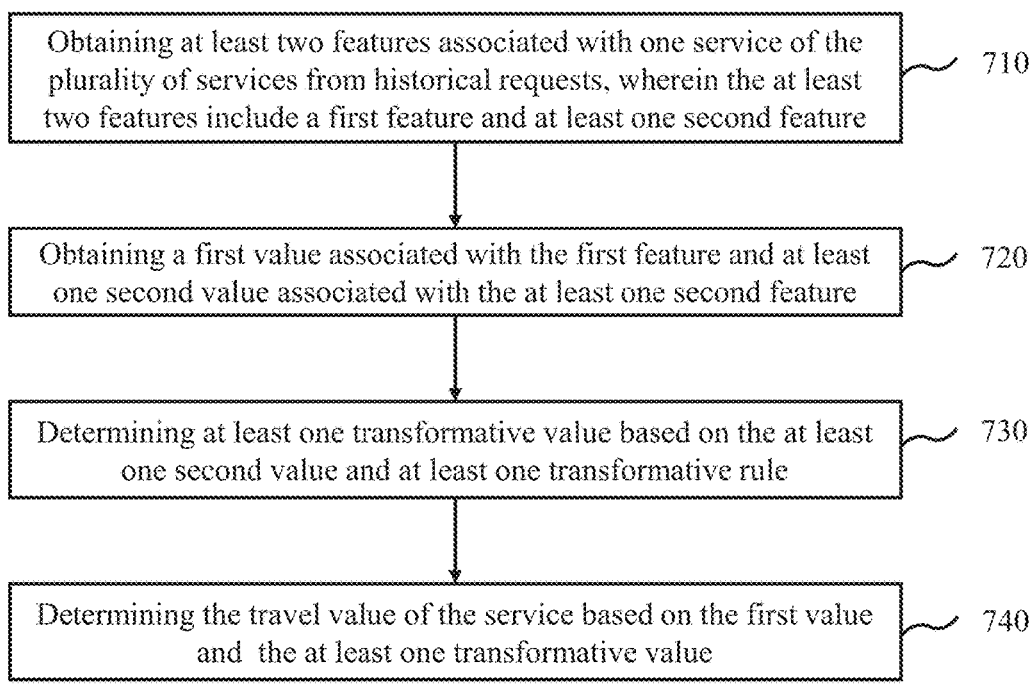
FIG. 7 shows an exemplary process 700 for determining a travel value for a service according to some embodiments of the present disclosure.

FIG. 7 shows an exemplary process 700 for determining a travel value for a service. Evaluation module 330 may determine travel values for the plurality of services to determine the updated sequence. The process and/or method 700 may be executed by the on-demand service system 100. For example, the process and/or method 700 may be implemented as a set of instructions (e.g., an application) stored in the ROM 230. The CPU 220 may execute the set of instructions and may accordingly be directed to perform the process and/or method 700.

In step 710, evaluation module 330 may obtain at least two features associated with one service of the plurality of services from historical requests. The at least two features may include a first feature and at least one second feature. The at least two features may include a number of historical requests for the service within the first time period, a number of completed historical requests for the service within the first time period, current availability information indicating a supply level of the service, a number of page views for a page displaying the service, or a number of unique visitors visiting the page displaying the service.

In step 720, evaluation module 330 may obtain a first value associated with the first feature and at least one second value associated with the at least one second feature.

In step 730, evaluation module 330 may determine at least one transformative value based on the at least one second value and at least one transformative rule. In some embodiments, evaluation module 330 may obtain at least one transformative rule in advance. The transformative rule may be stored in ROM 230 or database 160. The transformative rule may be a mapping rule from a second value associated with a second feature to a transformative value associated with the second feature.

In some embodiments, the transformative rule may specify that the transformative value is one nth of the second value associated with the second feature. Here n may be a positive number.

For example, the service is a taxi service. The first feature is the number of historical requests for the taxi service within the first time period. The only second feature is the number of page views for the page displaying the taxi service. The transformative rule may specify that every ten times of page views may be equivalent to one historical requests. Supposing a user viewed the page 120 times during the last month, the transformative value associated with the number of page views is thus $$120 \times \frac{1}{10} = 12.$$

In step 740, evaluation module 330 may determine a travel value of the service based on the first value and the at least one transformative value.

In some embodiments, evaluation module 330 may determine a sum of the first value and the at least one transformative value as the travel value. For example, if the user also conducted 10 historical requests. Evaluation module 330 may determine the travel value as 10+12=22.

Alternatively, evaluation module 330 may determine an average of the first value and the at least one transformative value as the travel value.

It should be noted that the description above is just for illustrative purpose. Evaluation module 330 may determine the travel value according to any other rule. For example, processor may determine the travel value as a geometric average of the first value and the at least one transformative value.

Figure 8:
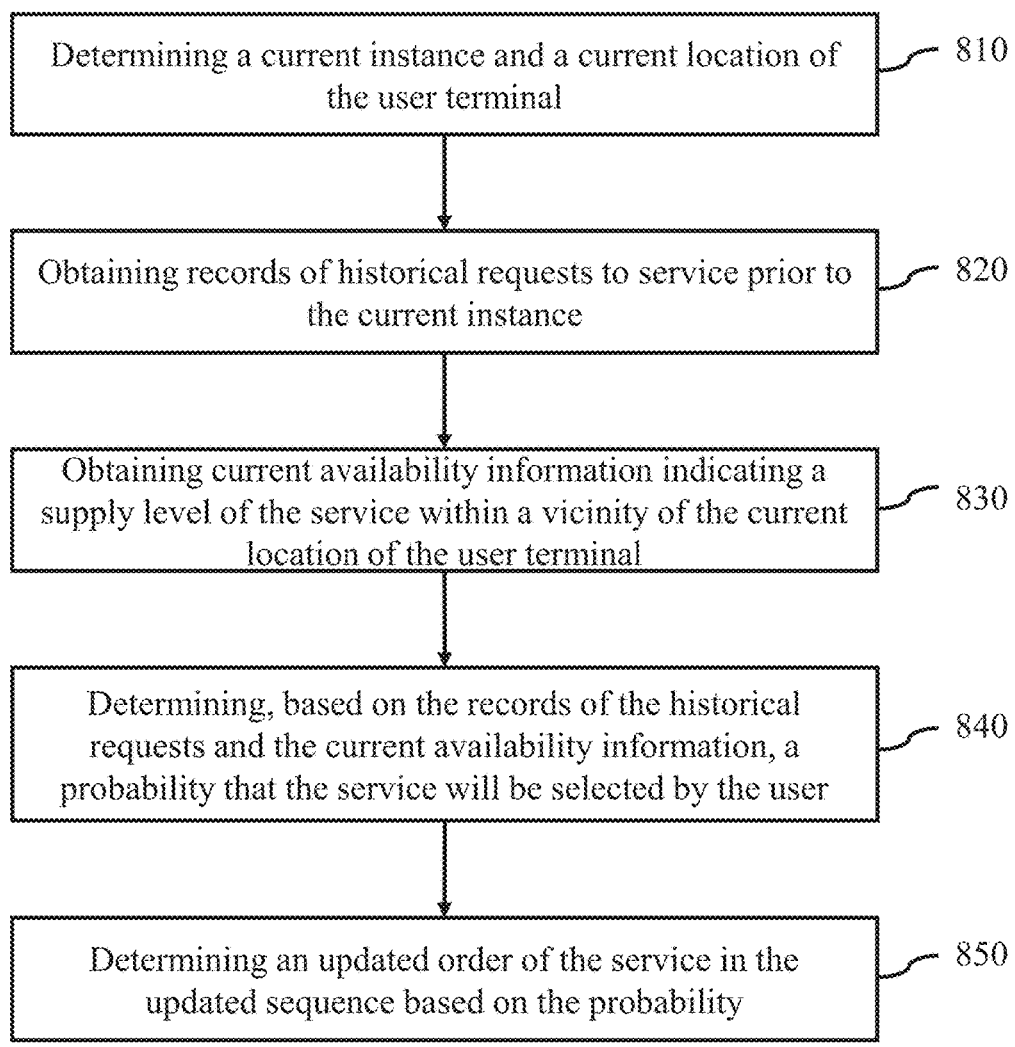
FIG. 8 is a flowchart illustrating an exemplary process/method 800 for determining an updated order of the services in the updated sequence according to some embodiments of the present disclosure.

FIG. 8 is a flowchart illustrating an exemplary process/method 800 for determining an updated order of the services in the updated sequence according to some embodiments of the present disclosure. The process and/or method 800 may be executed by the on-demand service system 100. For example, the process and/or method 800 may be implemented as a set of instructions (e.g., an application) stored in the ROM 230. The CPU 220 may execute the set of instructions and may accordingly be directed to perform the process and/or method 800.

In step 810, the acquisition module 310 may obtain or determine a current instance and a current location of the user terminal 130. In some embodiments, the user terminal 130 may send a terminal ID to the COM ports 250. The current time may be a time when the user terminal 130 sends the terminal ID, or a time when the COM ports 250 receives the terminal ID. The current location may be a geographical location where the user terminal 130 sends the terminal ID.

In step 820, the acquisition module 310 may obtain records of historical requests to the services within a predetermined time period prior to the current instance. For example, the predetermined time period may be a week five days, one day, etc. In some embodiments, the records of historical requests may include a first type of records. The first type of records may be associated with one or more similar user terminals 130s within a second geographical area. The similar user terminals 130s may share some characteristics with the user terminal to be assigned a sequence. The second geographical area may encompass the current location. For example, the second geographical area may be an administrative district. The first type of records may include a number of a plurality of first historical requests and the service selected for each of the plurality of first historical requests. As used herein, the first historical requests are generated by the one or more user terminals 130s. The first historical requests may be generated within a third time period prior to the current instance. The third time period may be fixed or adjustable.

In some embodiments, the records of historical requests may include a second type of records associated with the user terminal 130. The acquisition module 310 may obtain the second type of records relating to the terminal ID. The second type of records may include a number of a plurality of second historical requests, a plurality of second historical requesting time, a probability of using coupons for the user, information relating to the user's visit to a page displaying the service (e.g., a number of visit to the page, a total duration on the page, etc.), etc. Each of the plurality of second historical requesting time may be associated with a second historical request. The evaluation module 330 may determine the probability of using coupons for the user based on a total number of used coupons and a number of used coupons for each service of the user.

In step 830, the acquisition module 310 may obtain current availability information of each service within a vicinity of the current location of the user terminal 130. The current availability information may indicate a supply level of the service. The current availability information may include a number of available service providers associated with the service within the vicinity of the user terminal 130 (e.g., the available service provider number within 100 m around the user terminal 130). The current availability information may further include a number of current service requests associated with the service within a second time period (e.g., 5 minutes) from the current instance within the vicinity of the user terminal 130.

In step 840, the evaluation module 330 may determine a probability that the service will be selected by the user based on the records of historical requests and the current availability information.

In some embodiments, the evaluation module 330 may determine the probability that the service will be selected by the user based on a machine learning method. The machine learning method may include Bayes Model (e.g., Naive Bayes Classifier), neural network model, or the like, or a combination thereof.

Taking Naive Bayes Classifier as an example, the evaluation module 330 may determine the probability based on a plurality of features of the service. The plurality of features may be determined based on the records of historical requests. The processor may determine the probability for a service by determining a conditional probability based on the plurality of features. Vector $X=\{a_1, a_2, \ldots, a_m,\}$ may denote the plurality of features. Vector $Y=\{y_1, y_2, \ldots, y_m,\}$ may denote the plurality of services. The probability for the services may be represented as $P(y_i|X)$. As used herein, $P(y_i|X)$ may denote the probability that the service $y_i$ will be selected by the user based on the probability of occurrence of feature X. The probability of occurrence of feature X may be determined based on a probability of occurrence of feature $a_1, a_2, \ldots,$ and $a_m$. The probability of occurrence of feature X may be trained by the records of historical requests.

In some embodiments, the evaluation module 330 may determine the plurality of features based on the first type of records. For example, the evaluation module 330 may determine a popularity of the services based on the first type of records. The popularity of service $y_i$ may be determined by equation (7) below:

$$r_i = \frac{n_i}{\sum n_i} * 100\% \qquad (7)$$

where i denotes an index of the service, $r_i$ denotes the popularity of service $y_i$, $n_i$ denotes a number that service $y_i$ was selected by users of the first type of records, $\Sigma n_i$ denotes a total number that services $Y=\{y_1, y_2, \ldots, y_m,\}$ were selected by users of the first type of records. The sorting module 340 may multiply $r_i$ by 100 and determine the integer part of the result as a feature representing the popularity of service $y_i$. For example, if the popularity for service $y_i$ is 90.6%, the evaluation module 330 may determine the popularity for service $y_i$ as 90.

In some embodiments, the evaluation module 330 may determine the plurality features based on the second type of records. Based on the terminal ID, the evaluation module 330 may determine that the services selected through the terminal for the latest three requests are $\{y_2, y_1, y_1\}$. A user-preference for the services may be determined by equation (8) below:

$$DCG_i = \sum\nolimits_{k \in i} \frac{1}{\sqrt{k}} \qquad (8)$$

where i denotes an index of the service, k is an index of the rank of service $y_i$, $DCG_i$ denotes the user-preference for the service $y_i$. For example, the index of the rank of service $y_2$ is 1, $$DCG_2 = \frac{1}{\sqrt{1}} = 1.$$

The index of the rank of service $y_i$ is 2 and 3, $$DCG_1 = \frac{1}{\sqrt{2}} + \frac{1}{\sqrt{3}} = 1.28.$$

In some scenarios, a recent historical service request may reflect a user's preference more accurately. As used herein, the $$\frac{1}{\sqrt{k}}$$

may render a recent historical request more influential than an earlier historical request.

In some embodiments, the evaluation module 330 may determine a plurality of features based on the order of $DCG_i$. For example, for $DCG_1=1.28$, $DCG_2=1$, the evaluation module 330 may determine the rank of service $y_1$ and $y_2$ as features representing the user-preference of the services.

As another example, the evaluation module 330 may determine a feature based on the ratio of $DCG_1$ to $DCG_2$. As a way of discretization, the evaluation module 330 may multiply the ratio of $DCG_1$ to $DCG_2$ by 10 and determine the integer part of the result as a feature representing the user-preference of the services. For example, $$\frac{10 * DCG_1}{DCG_2} = \frac{10 * 1.28}{1} = 12.8.$$

The multiplying by a number greater than 1 cause the two values ($DCG_1$ and $DCG_2$) much more distinguishable.

In some embodiments, the evaluation module 330 may determine the plurality of features based on the current availability information. For example, the evaluation module 330 may determine the number of available service providers associated with the service within the vicinity of the user terminal 130 as a feature. As another example, the evaluation module 330 may determine the number of current service requests associated with the service within a second time period from the current instance within the vicinity of the user terminal 130.

In step 850, the sorting module 340 may determine an updated order of the services in the updated sequence based on the probability. The sorting module 340 may rank the probabilities of the services in descending order. For example, if the probability for the user to select service $y_1$ is 20%, the probability to select service $y_2$ is 30%, the probability to select service $y_3$ is 50%, thus the updated order of the updated sequence may be $y_3$, $y_2$, and $y_1$.

For a certain service, the evaluation module 330 may determine the number of available service providers associated with the service within the vicinity of the user terminal 130 according to equation (9).

$$value = \begin{cases} 10, & \text{otherwise} \\ n_i, & n_i < 10 \end{cases} \quad (9)$$

Table (1) shows numbers of service providers for a kth service within a plurality of vicinities of a user initiating a service request.

TABLE 1

| Range of request (m) | No. of available service providers |
|---|---|
| 0-99 | $n_0$ |
| 100-199 | $n_{100}$ |
| 200-299 | $n_{200}$ |
| 300-399 | $n_{300}$ |
| 400-499 | $n_{400}$ |
| 500-599 | $n_{500}$ |
| 600-699 | $n_{600}$ |
| 700-799 | $n_{700}$ |
| 800-899 | $n_{800}$ |
| 900-999 | $n_{900}$ |
| 1000-1199 | $n_{1000}$ |
| 1200-1399 | $n_{1200}$ |
| 1400-1599 | $n_{1400}$ |
| 1600-1799 | $n_{1600}$ |
| 1800-1999 | $n_{1800}$ |
| 2000-2499 | $n_{2000}$ |
| 2500-2999 | $n_{2500}$ |
| 3000-3999 | $n_{3000}$ |
| 4000~ | $n_{4000}$ |

For a certain service, the evaluation module 330 may determine the number of service requests associated with the service according to equation (10). The service requests may be initiated within a time period of 5 minutes before the user's request.

$$value = \begin{cases} 10, & \text{otherwise} \\ n_i, & n_i < 10 \end{cases} \quad (10)$$

Table (2) shows numbers of service providers for a kth service within a plurality of vicinities of a user initiating a service request.

TABLE 2

| Range of request (m) | No. of service requests |
|---|---|
| 0-99 | $n_0$ |
| 100-199 | $n_{100}$ |
| 200-299 | $n_{200}$ |
| 300-399 | $n_{300}$ |
| 400-499 | $n_{400}$ |
| 500-599 | $n_{500}$ |
| 600-699 | $n_{600}$ |
| 700-799 | $n_{700}$ |
| 800-899 | $n_{800}$ |
| 900-999 | $n_{900}$ |
| 1000-1199 | $n_{1000}$ |
| 1200-1399 | $n_{1200}$ |
| 1400-1599 | $n_{1400}$ |
| 1600-1799 | $n_{1600}$ |
| 1800-1999 | $n_{1800}$ |
| 2000-2499 | $n_{2000}$ |

TABLE 2-continued

| Range of request (m) | No. of service requests |
|---|---|
| 2500-2999 | $n_{2500}$ |
| 3000-3999 | $n_{3000}$ |
| 4000~ | $n_{4000}$ |

Figure 9:
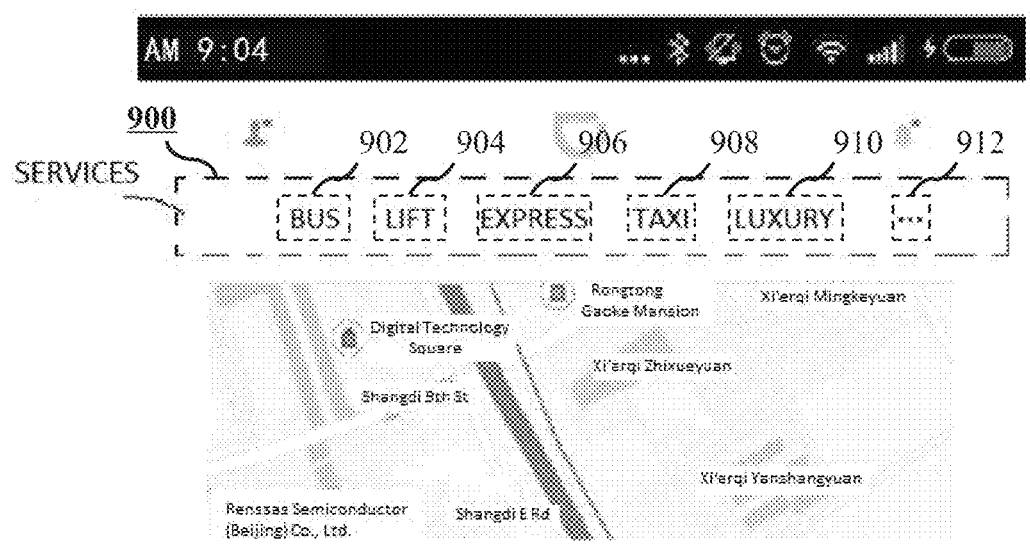
FIG. 9 is a schematic diagram of an exemplary user interface showing a sequence of a plurality of services according to some embodiments of the present disclosure.

FIG. 9 shows an exemplary user interface showing a sequence of a plurality of services. 900 shows the sequence of the plurality of services. The services may include a bus service 902, a lift service 904, an express service 906, a taxi service 908, a luxury service 910, and one or more services 912 displayed in a background window. In some embodiments, the user interface may display the services 912 when user clicks at the ellipsis mark (three spaced dots).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A system configured to display a plurality of services on an interface of a user terminal, comprising:
  processors electronically connected to at least one storage medium via a bus, wherein during operation, the processors read the at least one storage medium and load a set of instructions from the at least one storage medium, and:
    establish a network communication with the user terminal;
    obtain electronic signals from the bus from the user terminal, the electronic signals including an identification associated with a user account registered with the system;

obtain electronic signals from the bus, the electronic signals including a current sequence of the plurality of services associated with the identification;

determine a travel value of each service of the plurality of services indicating a trend of the user to request for the service;

determine whether a ratio between a characteristic value for the current sequence of the plurality of services and a characteristic value for an optimized sequence of the plurality of services is less than a threshold, the characteristic value for the current sequence of the plurality of services being a sum of a plurality of fractions, wherein each fraction of the plurality of fractions is associated with a service of the plurality of services, and wherein for each service of the plurality of services, the fraction for the service is associated with an order of the service in the current sequence of the plurality of services and the travel value of the service, when the ratio is not less than the threshold, send out electronic signals including the current sequence of the plurality of services to the user terminal; and when ratio is less than the threshold, determine an updated sequence of the plurality of services displayed on the display of the user terminal.

2. The system of claim 1, wherein the processors further obtain electronic signals from the bus from the user terminal, the electronic signals including a current location of the user terminal, and the processors further determine whether:

a number of days in which the user initiates service requests within a first geographical area encompassing the current location of the user terminal is more than a first threshold; or an interval between a previous updating time of the sequence of the plurality of services and a current instance is longer than a second threshold.

3. The system of claim 1, wherein for each service of the plurality of services, the travel value is determined based on at least one of:

a number of historical service requests for the service within a first time period;

a number of completed historical service requests for the service within the first time period;

current availability information indicating a supply level of the service;

a number of page views for a page displaying the service; or a number of unique visitors visiting the page displaying the service.

4. The system of claim 1, wherein to determine the updated sequence of the plurality of services, the processors further:

for each service of the plurality of services, obtain electronic signals from the bus, the electronic signals including records of historical requests to service conducted through the user terminal;

determine, based on the records of the historical requests, the travel value of the service indicating a trend of the user to request for the service; and determine the updated sequence based on the travel value of the service.

5. The system of claim 1, wherein to determine the updated sequence of the plurality of services, processors further:

obtain electronic signals from the bus from the user terminal, the electronic signals including a current instance and a current location of the user terminal; and for each service of the plurality of services, obtain electronic signals from the bus, the electronic signals including records of historical requests to service prior to the current instance;

obtain electronic signals from the bus, the electronic signals including current availability information indicating a supply level of the service within a vicinity of the current location of the user terminal;

determine, based on the records of the historical requests and the current availability information, a probability that the service will be selected by the user; and determine an updated order of the service in the updated sequence based on the probability.

6. The system of claim 5, wherein the current availability information of the service comprises:

a number of available service providers associated with the service within the vicinity of the user terminal; and a number of current service requests associated with the service within a second time period from the current instance within a vicinity of the user terminal.

7. The system of claim 5, wherein the records of historical requests comprise a first type of records associated with one or more other user terminals within a second geographical area encompassing the current location of the user terminal, and wherein, for each service of the plurality of services, the first type of records includes a number of a plurality of first historical requests within a third time period from the current instance.

8. The system of claim 7, wherein the records of historical requests further comprise a second type of records associated with the user terminal, and wherein, for each service of the plurality of services, the second type of records includes at least one of:

a number of a plurality of second historical requests;

a plurality of second historical requesting time, wherein each second historical requesting time of the plurality of second historical requesting time is associated with a second historical request of the plurality of second historical requests;

a probability of using coupons for the user; or information relating to the user's visit to a page displaying the service.

9. The system of claim 8, wherein for each service of the plurality of services, the information relating to the user's visit to the page displaying the service comprises at least one of:

a number of visit to the page; or a total duration on the page.

10. A method for displaying a plurality of services on an interface of a user terminal and configured to operate an online on-demand transportation service on at least one electronic device having processors, at least one storage medium, and a communication platform connected to a network, comprising:

establishing, by the processors, a network communication with the user terminal;

obtaining, by the processors, an identification associated with a user account registered with the online on-demand transportation service platform from the user terminal;

obtaining, by the processors, a current sequence of the plurality of services associated with the identification;

determining, by the processors, a travel value of each service of the plurality of services indicating a trend of the user to request for the service;

determining, by the processors, whether a ratio between a characteristic value for the current sequence of the plurality of services and a characteristic value for an optimized sequence of the plurality of services is less than a threshold, the characteristic value for the current sequence of the plurality of services being a sum of a plurality of fractions, wherein each fraction of the plurality of fractions is associated with a service of the plurality of services, and wherein for each service of the plurality of services, the fraction for the service is associated with an order of the service in the current sequence of the plurality of services and the travel value of the service;

when the ratio is not less than the threshold, sending, by the processors, the current sequence of the plurality of services to the user terminal; and when the ratio is less than the threshold, determining, by the processors, an updated sequence of the plurality of services displayed on the display of the user terminal.

11. The method of claim 10, further comprising obtaining, by the processors, a current location of the user terminal from the user terminal, and the method further comprising determining, by the processors, whether:

a number of days in which the user initiates service requests within a first geographical area encompassing the current location of the user terminal is more than a first threshold; or an interval between a previous updating time of the sequence of the plurality of services and a current instance is longer than a second threshold.

12. The method of claim 10, wherein for each service of the plurality of services, the travel value is determined based on at least one of:

a number of historical service requests for the service within a first time period;

a number of completed historical service requests for the service within the first time period;

current availability information indicating a supply level of the service;

a number of page views for a page displaying the service; or a number of unique visitors visiting the page displaying the service.

13. The method of claim 10, wherein to determine the updated sequence of the plurality of services, further comprising:

for each service of the plurality of services,
obtaining by the processors, records of historical requests to service conducted through the user terminal;
determining by the processors, based on the records of the historical requests, the travel value of the service indicating a trend of the user to request for the service; and
determining by the processors, the updated sequence based on the travel value of the service.

14. The method of claim 10, wherein to determine the updated sequence of the plurality of services, further comprising:

obtaining, by the processors, a current instance and a current location of the user terminal from the user terminal; and for each service of the plurality of services,
obtaining, by the processors, records of historical requests to service prior to the current instance;
obtaining, by the processors, current availability information indicating a supply level of the service within a vicinity of the current location of the user terminal;
determining, by the processors, based on the records of the historical requests and the current availability information, a probability that the service will be selected by the user; and
determining, by the processors, an updated order of the service in the updated sequence based on the probability.

15. The method of claim 14, wherein the current availability information of the service comprises:

a number of available service providers associated with the service within the vicinity of the user terminal; and a number of current service requests associated with the service within a second time period from the current instance within a vicinity of the user terminal.

16. The method of claim 14, wherein the records of historical requests comprise a first type of records associated with one or more other user terminals within a second geographical area encompassing the current location of the user terminal, and wherein, for each service of the plurality of services, the first type of records includes a number of a plurality of first historical requests within a third time period from the current instance.

17. The method of claim 16, wherein the records of historical requests further comprise a second type of records associated with the user terminal, and wherein, for each service of the plurality of services, the second type of records includes at least one of:
a number of a plurality of second historical requests;
a plurality of second historical requesting time, wherein each second historical requesting time of the plurality of second historical requesting time is associated with a second historical request of the plurality of second historical requests;
a probability of using coupons for the user, or
information relating to the user's visit to a page displaying the service.

18. The method of claim 17, wherein for each service of the plurality of services, the information relating to the user's visit to the page displaying the service comprises at least one of:

a number of visit to the page; or
a total duration on the page.

* * * * *